(12) United States Patent
DelTel et al.

(10) Patent No.: US 7,297,924 B2
(45) Date of Patent: Nov. 20, 2007

(54) IMAGING DEVICE WITH FOCUS SWITCHING MEANS FOR DAY AND NIGHT VISION

(75) Inventors: Geoffroy DelTel, Antony (FR); Sylvain Faure, Paris (FR); Denis Guettier, Charny (FR); Philippe Patry, Fontenay Aux Roses (FR)

(73) Assignee: Sagem Defense Securite, Paris (FR)

( * ) Notice: Subject to any disclaimer, the term of this patent is extended or adjusted under 35 U.S.C. 154(b) by 38 days.

(21) Appl. No.: 11/332,739

(22) Filed: Jan. 13, 2006

(65) Prior Publication Data

US 2007/0040106 A1 Feb. 22, 2007

(30) Foreign Application Priority Data

Jan. 14, 2005 (FR) .................................. 05 00397

(51) Int. Cl.
 *H01J 43/04* (2006.01)
 *H01J 21/20* (2006.01)
 *H01J 3/14* (2006.01)

(52) U.S. Cl. .............................. 250/214 VT; 250/207; 250/216; 250/226; 250/234; 313/523; 313/524; 313/542; 348/216.1

(58) Field of Classification Search ......... 250/214 VT, 250/207, 216, 226, 234, 330, 332, 333; 313/523–525, 313/527, 542; 348/216.1
 See application file for complete search history.

(56) References Cited

U.S. PATENT DOCUMENTS

| | | | |
|---|---|---|---|
| 3,735,139 A * | 5/1973 | Kalitinsky et al. .... 250/214 VT |
| 4,687,922 A * | 8/1987 | Lemonier et al. ..... 250/214 VT |
| 4,695,718 A | 9/1987 | Dill |
| 5,070,407 A | 12/1991 | Wheeler et al. |
| 5,373,320 A * | 12/1994 | Johnson et al. .......... 348/217.1 |
| 6,069,352 A | 5/2000 | Castracane |
| 6,111,692 A | 8/2000 | Sauter |
| 6,307,586 B1 | 10/2001 | Costello |
| 6,657,178 B2 * | 12/2003 | Aebi ..................... 250/214 VT |
| 6,726,105 B2 * | 4/2004 | Patel et al. ............. 235/462.45 |

FOREIGN PATENT DOCUMENTS

| | | |
|---|---|---|
| EP | 1 014 419 A1 | 6/2000 |
| EP | 1306906 | 6/2000 |

\* cited by examiner

*Primary Examiner*—Davienne Monbleau
(74) *Attorney, Agent, or Firm*—Blakely, Sokoloff, Taylor & Zafman

(57) ABSTRACT

An optronic observation device including a detector having a photocathode and a sensor arranged to receive an incident light beam. The device also including a switch to position an optical element opposite the detector in the pathway of the incident beam or to retract the optical element and a focusing element to focus an incident ray on the photocathode when the optical element is in a retracted position. When the optical element is positioned opposite the detector, it is able to focus the beam on the sensor and to filter the beam spectrally to block all or part of the wavelengths for which the responsiveness of the photocathode is greater than a given threshold.

13 Claims, 2 Drawing Sheets

IMAGING DEVICE WITH FOCUS SWITCHING MEANS FOR DAY AND NIGHT VISION

GENERAL TECHNICAL AREA

The present invention pertains to devices for day and night vision.

More precisely, it concerns an optronic device for day and night vision, in particular a portable device.

PRIOR ART

Optronic devices for day and night vision are used in various portable devices for the observation of an environment. The observation devices are installed for example in binoculars and/or the sights of weapons or infantry helmets.

It will be understood that portable observation devices are most preferably of small size and lightweight.

Known optronic observation devices generally comprise an integrated day optic pathway and night optic pathway.

An example of said device may therefore comprise two separate pathways. For a video device, this may then comprise two optic pathways and two separate sensors.

Preferably, the day pathway comprises a known detection matrix of Charge-Coupled Device (CCD) type or a known detection matrix of Complementary Metal-Oxide Semiconductor type (CMOS).

Generally the night pathway comprises either a light intensifier device coupled to a Charge-Coupled Device called an Intensified Charge-Coupled Device (ICCD), or a light intensifier device coupled to a Complementary Metal-Oxide Semiconductor called an Intensified Complementary Metal-Oxide Semiconductor (ICMOS), or preferably a known Electronic Bombarded Complementary Metal-Oxide Semiconductor (EBCMOS) or a known Electron Bombarded Charge-Coupled Device (EBCCD).

In day and night vision devices of LI type (light intensifier) a photocathode firstly conducts conversion of incident photons derived from the scene into electrons. The electrons are then multiplied in an amplifying plate formed of microchannels before striking a phosphorus screen which in turn conducts conversion of the electrons into emitted photons. The emitted photons are then sent via a taper of optic fibres onto a CCD or CMOS sensor, after which a video image can be obtained.

FIG. 1 shows that in night vision devices using EBCMOS or EBCCD technology, a lens focuses the incident photons 10 derived from the scene onto a photocathode 11 located in a sealed casing 25. As in devices of LI tube type, the material of the photocathode 11 contains AsGa (gallium arsenide) or is a multi-alkali material. The photocathode converts the photons into electrons 13. The latter are accelerated in a chamber 12 in which a vacuum is set up and in which a difference of potential of absolute value V of several thousand volts is applied. The accelerated electrons 13 "bombard" a CMOS or CCD matrix 14 making it possible to obtain a video image via means 15 at the output of matrix 14. Means 26 enable control and polarisation signals to be sent to the casing 25.

EBCMOS or EBCCD tehnologies have the particular advantage of allowing the design of night vision devices to be less costly, more lightweight, less cumbersome and with lower consumption than those using LI tube technology, in particular on account of the absence of an amplifying micro-channel plate and phosphorus screen. Also, the absence of this micro-channel plate minimises gas desorption, thereby facilitating the maintaining of a high quality vacuum that is required inside the casing to guarantee low noise and a long life span of the photocathode.

A day/night observation device may also comprise two semi-separate pathways.

FIG. 2 shows that in this case the device comprises an optic pathway 1 common to both sensors 2 and 3 via a beam separator 4. The day sensor 2 is a CCD matrix for example or CMOS matrix. The night sensor 3 is an ICCD or ICMOS device for example, or preferably an EBCMOS or EBCCD sensor.

The preceding devices have drawbacks however.

Said observation devices allow day/night observation but they require numerous optical elements and two sensors. The assembly of said elements and sensors is made to the detriment of compactness and lightweight of the observation device. They are therefore cumbersome and relatively heavy, due to the presence of the two separate or semi-separate pathways.

To solve these problems, it is possible to provide only a single pathway in the observation device.

FIG. 3 shows that current LI devices can be used during the daytime by positioning a retractable element 5 between the environment and the objective lens of the optic pathway 1. Element 5 is a diaphragm and/or an optical density positioned on the lens. For night vision element 5 is retracted. For daytime vision the element is positioned on the lens to allow use of the device, and in particular use of sensor 2, without any risk of over-illuminating the photocathode.

Operationally, the use of said observation device is of little interest insofar as image quality is limited by the LI tube and the yield of its conversions. The use of a LI device in daytime mode does not match that of a conventional daytime pathway (CMOS or CCD).

Prior art observation devices do not permit use of EBCMOS or EBCCD technology for daytime vision in an observation device comprising a single optic pathway, in particular due to the degradation of the photocathode under strong daytime illumination and to the need for refocusing between the daytime beam and night beam.

PRESENTATION OF THE INVENTION

The invention sets out to overcome at least one of these disadvantages.

For this purpose, the invention proposes an optronic observation device comprising a detector, the detector comprising a photocathode and a sensor arranged to receive an incident light beam, the device also comprising switching means able to position an optic element opposite said detector on the pathway of the incident beam, or to retract said element, the device comprising means able to focus an incident ray on the photocathode when the element is in retracted position, characterised in that the element, when positioned opposite the detector, is able to focus the beam on the sensor and to filter the beam spectrally to block all or part of the wavelengths for which the responsiveness of the photocathode is greater than a given threshold.

The invention is advantageously completed by the following characteristics either alone or in any technically possible combination thereof:

the responsiveness threshold for which the element is able to filter the wavelengths corresponds to a threshold of thermal non-degradation of the photocathode. It defines a spectral zone for which the photocathode no longer or scarcely interacts with the incident photons and for which sensor responsiveness is sufficient to provide a video signal of good quality;

the photocathode is positioned upstream of the sensor on the beam pathway and comprises gallium arsenide (AsGa) or silicon with multi-alkali deposit, the sensor is of Complementary Metal-Oxide Semiconductor type or Charge-Coupled type, the switching means are also able to position an optical balancing plate opposite the detector on the pathway of the incident beam when the optical element is in retracted position, or is able to retract said balancing plate when the element is opposite the detector;

the balancing plate is able to filter the beam spectrally to block certain wavelengths;

the plate comprises at least two zones for filtering wavelengths, the switching means being able to position each zone opposite the detector in relation to use of the device;

the element is able to close the optical aperture of the detector;

the detector is of EBCMOS or EBCCD type, the detection face of the CMOS or CCD sensor being the rear face;

the day and night vision device is adapted in particular so that it can be positioned on an infantry helmet or on a weapon.

The observation device of the invention has numerous advantages.

Firstly, it is compact and lightweight. It only comprises a single optic pathway common to day and night vision. It also allows day and night vision using one same sensor.

In particular it enables the use of EBCMOS or EBCCD technology for night vision, and permits the switching from EBCMOS or EBCCD night technology to CMOS or CCD technology for day vision without having to refocus the incident ray.

In addition, it provides protection for the photocathode during daytime vision without the use of a diaphragm or optical density.

The invention fulfils the same functions as prior art devices while associating therewith good image quality due in particular to good CMOS resolution for example, and is not costly since no LI tube is needed.

The invention is very simple to produce since it only comprises a single optic pathway, a single sensor and a mobile filter also protecting the photocathode. The invention is also very simple to use.

PRESENTATION OF THE FIGURES

Other characteristics, purposes and advantages of the invention will become apparent from the following description which is solely illustrative and not limitative and is to be read with reference to the appended drawings in which:

FIG. 1, already commented upon, schematically shows a known detector of EBCMOS or EBCCD type;

FIGS. 2 and 3, already commented upon, show day/night vision devices comprising separate or semi-separate pathways;

In all the figures, similar parts carry an identical reference number.

DETAILED DESCRIPTION

The invention chiefly comprises an optical device intended to equip a sight on an infantry helmet for example or a weapon.

The device advantageously permits day and night vision.

Figure 5A:
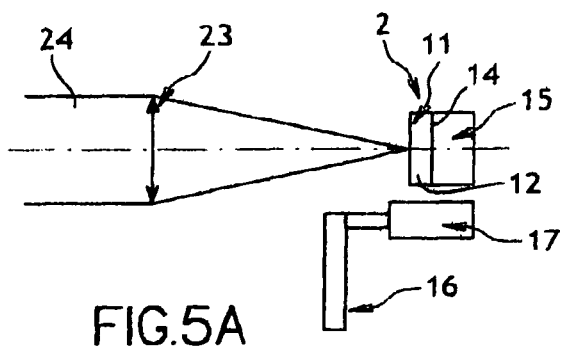
FIGS. 5A and 5B show a first possible embodiment of an optronic observation device of the invention, in night position and day position respectively.

For this purpose, FIG. 5A shows that an optronic observation device according to the invention, in night observation position, comprises a detector 2 comprising a photocathode 11 and an optic sensor 14. The photocathode 11 is positioned upstream of the sensor 14 on the pathway of a light beam 24 derived from the scene to be observed. The incident light beam 24 is focused by means of a lens 23 on the photocathode 11 of the detector in night position.

For this purpose, the photocathode 11 conducts a conversion of the photons of beam 24 to covert them into electrons able to be detected by the sensor 14. The electrons pass through a chamber 12 between the photocathode 11 and the sensor 14 and come to strike the sensor 14 to give a night image via processing by means 15 at the output of the sensor 14. Preferably, the chamber 12 is a vacuum chamber in which a difference of potential in the order of 2000 volts prevails, in order to suitably accelerate the electrons produced by the photocathode 11.

The detector 14 may be of Charge-Coupled Device (CCD) type or preferably of Complementary Metal-Oxide Semiconductor (CMOS) type. Preferably, the detection face of the CMOS or CCD sensor 14 is the rear face. Detection on the rear face makes it possible to improve the detection yield of the sensor and avoids filling-factor problems on the front face of the sensor.

It will be understood that the detector 2 is of EBCCD type or preferably of EBCMOS type. The photocathode 11 may be a Generation-2 photocathode containing silicon and multi alkali deposit, or preferably a Generation-3 photocathode containing gallium arsenide (AsGa).

Figure 5B:
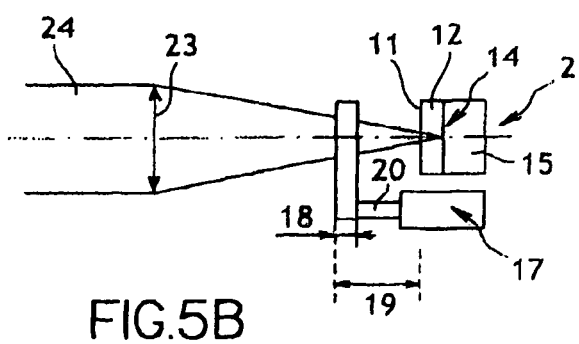

FIG. 5B shows the device in FIG. 5A but this time in position for day vision.

In FIG. 5B it will be noted that the device comprises switching means 17 able to position an optical element 16 opposite the detector 2 on the pathway of the incident beam 24. Element 16 in this position is able to focus the incident beam 24 on the sensor and no longer on the photocathode 11. Element 16 is also able to filter beam 24 spectrally to block the wavelengths for which the responsiveness of the photocathode is greater than a given threshold.

Figure 1:
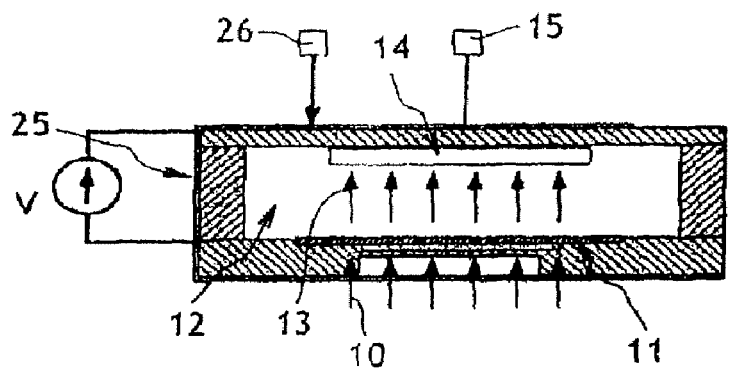
Figure 2:
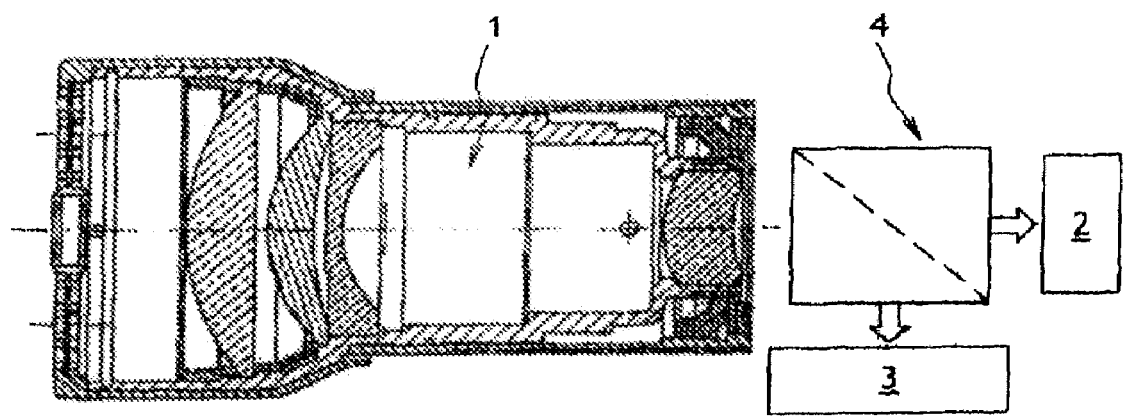
Figure 3:
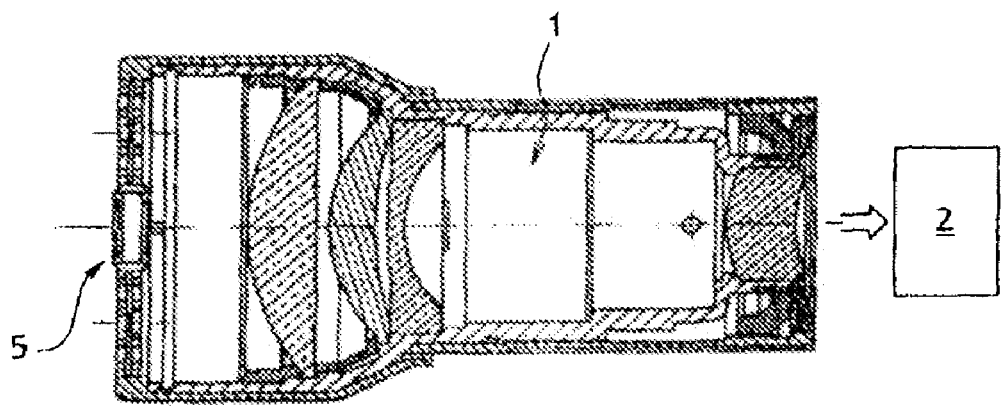
Figure 4:
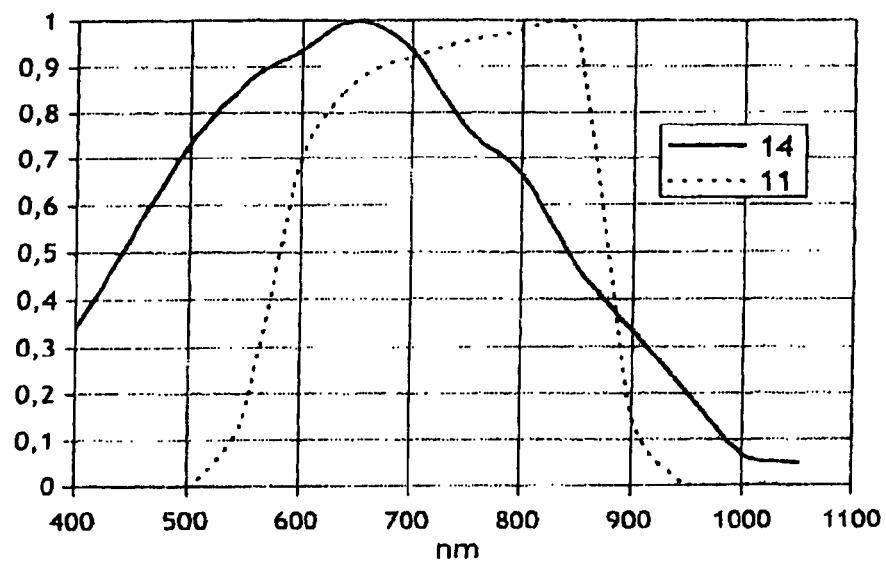
FIG. 4 shows the curves of standard responsiveness of the AsGa photocathode (dotted lines) and of the sensor (solid lines) in relation to the wavelength of an incident light beam.

FIG. 4 shows sample curves of standard responsiveness of photocathode 11 (in dotted lines) for an AsGa photocathode and sensor 14 (in solid lines) in relation to the wavelength of the incident beam. Evidently the curve in dotted lines may optionally change for different photocathodes depending upon doping.

It is ascertained that for wavelengths of less than 500 nanometres or greater than 950 nanometres, the photocathode 11 is transparent to the incident beam since its responsiveness it practically zero. On the other hand, for wavelengths lying substantially between 600 nanometres and 850 nanometres (i.e. part of the visible band and near infrared) the responsiveness of the photocathode is optimal. If a photocathode is used in this band of optimal responsiveness with illumination intensities corresponding to daytime intensities, it may be destroyed or seriously damaged (heat destruction and early wear).

Consequently if, in front of the photocathode 11, an optical element 16 is arranged which spectrally filters the beam to block out wavelengths for which the responsiveness of the photocathode is greater than a given threshold, the photocathode will be protected against damage by light that is too intense.

The preferable threshold is one half or less of the maximum responsiveness of the photocathode. This threshold typically corresponds to a value of 100 mA/W for a standard AsGa photocathode.

For wavelengths which are not filtered, the photocathode 11 is transparent or semi-transparent.

If element 16, enabling filtration of the wavelengths which destroy photocathode 11, also permits focusing of the transmitted beam onto the sensor 14, it then becomes possible to conduct observation of the day environment.

Therefore with a device of the invention it is possible to use the sensor 14 for day vision with no refocusing of the lens 23 and without any risk of deteriorating the photocathode. It is recalled that preferably the sensor is of CMOS type and that the detector is generally of EBCMOS type.

Preferably, element 16 forms an optic filter able to filter the wavelengths for which the responsiveness of the photocathode is at best zero but at least less than a destruction threshold under day illumination. For an AsGa photocathode this corresponds to filtering wavelengths of less than 900 nm and/or filtering wavelengths greater than 530 nm.

Element 16 may advantageously be a dichroic plate. The transmitted wavelengths may either be in the visible band or in the near infrared band. It is to be noted that visualisation of the daytime pathway in the near IR offers some advantages among which an increase in contrast of the target against vegetation (chlorophyll albedo) and improved atmospheric transmission.

The switching means comprise a motor 17 for example, driving a shaft 20 connected to element 16.

The thickness 18 of element 16 is such that the beam 24 is focused on the sensor 14 after passing through the lens 23 and element 16.

These means 17 are evidently able to retract element 16 so that, if it is desired to return to night vision after day vision, the position in FIG. 5B changes to the position in FIG. 5A.

Figure 6A:
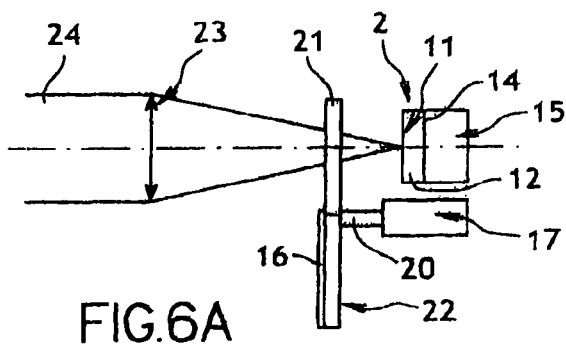
FIGS. 6A and 6B show a second possible embodiment of an optronic observation device of the invention, in night position and day position respectively.
Figure 6B:
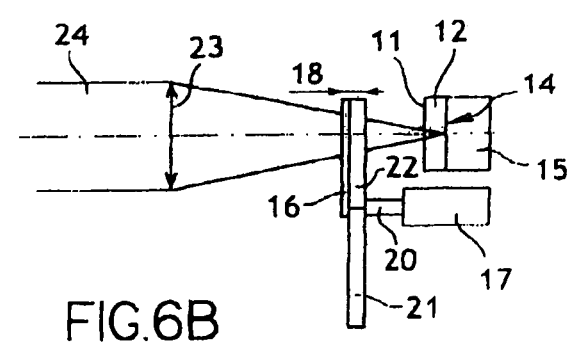

FIGS. 6A and 6B schematically show a second possible embodiment of a device of the invention.

According to this embodiment, to avoid mechanical unbalance of the device, the switching means are able to position a balance plate 21 opposite the detector on the pathway of the incident beam when the optical element 16 is in retracted position, as is the case FIG. 6A. Elements 21 and 16 are positioned symmetrically with respect to each other in relation to the longitudinal axis of the arm 20 coupled to the motor of the switching means 17.

FIG. 6B shows that the switching means 17 are able to retract the plate 21 when element 16 is opposite the detector 2.

The balancing plate advantageously permits the mechanical equilibrium of an element forming a supporting block 22 for element 16 should the thickness of element 16 be too narrow for easy handling and sufficient mechanical resistance. Evidently element 16 and the support 22 may be in a single piece. They would then form a single element.

Block 22 is not necessary if element 16 is sufficiently thick.

Preferably the balancing plate is also able to filter the beam spectrally to block some wavelengths. The balancing plate 21 evidently always permits focusing of the incident beam on the photocathode 11 in association with the lens 23.

Advantageously the plate 21 comprises at least two zones for filtering wavelengths. The switching means are able to position each zone opposite the detector in relation to the desired use of the device. The plate 21 may therefore be a high-pass filter and/or a low-pass filter.

Preferably block 22 and element 16 are able to close the optical aperture of the detector. They therefore form a diaphragm.

Block 22 and element 16 may comprise at least two zones for filtering wavelengths. The switching means are able to position each zone opposite the detector in relation to the desired use of the device. To position each filtering zone opposite the detector, shaft 20 needs only to be rotated to a different angle for example.

Closing of the aperture and the positioning of the different filters in day position provide good depth of field for the device.

As a further example, in daytime vision, block 22 and element 16 form a band-pass filter the band being centred for example around 500 nm.

It will be understood that optical filters other than those described may be positioned opposite the sensor in relation to the desired applications. In particular filters of different thickness allow the device to ensure day focusing (sensor) or night focusing (photocathode) for different distances to be focused.

The invention claimed is:

1. An Optronic observation device comprising a detector, the detector comprising a photocathode and a sensor arranged to receive an incident beam, the device also comprising switching means able to position an optical element opposite said detector in the pathway of the incident beam or to retract said optical element, the device comprising means able to focus an incident beam on the photocathode when the optical element is in retracted position, wherein the optical element, when positioned opposite the detector, is able to focus the incident beam on the sensor and to filter the incident beam spectrally to block all or part of the wavelengths for which the responsiveness of the photocathode is greater than a given threshold.

2. A device as in claim 1, wherein the responsiveness threshold corresponds to a threshold of thermal non-degradation of the photocathode, defining a spectral zone for which the photocathode no longer or only scarcely interacts with the incident photons and for which the responsiveness of the sensor supplies a video signal of good quality.

3. A device as in claim 1 or 2, wherein the photocathode is positioned upstream of the sensor in the pathway of the incident beam and comprises gallium arsenide (AsGa).

4. A device as in claim 1 or 2, wherein the photocathode is positioned upstream of the sensor in the pathway of the incident beam and comprises silicon and a multi-alkali deposit.

5. A device as in claim 1, wherein the sensor is a Complementary Metal-Oxide Semi-conductor sensor or a Charge Coupled Device sensor.

6. A device as in claim 5, wherein the detector is a chip, the chip having a backside and a frontside, a detection face of the sensor being the backside of the chip.

7. A device as in claim 1, wherein the switching means is also able to position a balancing plate opposite the detector in the pathway of the incident beam when the optical element is in retracted position, and to retract said balancing plate when the optical element is opposite the detector.

8. A device as in claim 7, wherein the balancing plate is able to filter the incident beam spectrally to block certain wavelengths.

9. A device as in claim 7, wherein the balancing plate comprises several optical filters of different thicknesses enabling the device to ensure night focusing on the photocathode for different focusing distances.

10. A device as in claim 1, wherein the optical element is able to reduce an optical aperture of the detector to form a diaphragm.

11. A device as in claim 1, wherein the optical element comprises at least two zones for filtering different wavelengths, the switching means being able to position each zone opposite the detector in relation to use of the device.

12. A device as in claim 1, wherein the optical element comprises several optical filters of different thickness enabling the device to ensure day focusing on the sensor for different focusing distances.

13. A telescope sight for day and night vision adapted for mounting on an infantry helmet or on a weapon, comprising a device as in claim 1.

* * * * *